United States Patent
Lin et al.

(10) Patent No.: US 10,684,658 B2
(45) Date of Patent: *Jun. 16, 2020

(54) HINGE ASSEMBLY, ROTATION MECHANISM AND FOLDABLE MOBILE TERMINAL

(71) Applicant: GUANGDONG OPPO MOBILE TELECOMMUNICATIONS CORP., LTD., Dongguan, Guangdong (CN)

(72) Inventors: Yugui Lin, Guangdong (CN); Jiao Cheng, Guangdong (CN)

(73) Assignee: GUANGDONG OPPO MOBILE TELECOMMUNICATIONS CORP, LTD., Dongguan, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/351,178

(22) Filed: Mar. 12, 2019

(65) Prior Publication Data

US 2019/0212786 A1 Jul. 11, 2019

Related U.S. Application Data

(63) Continuation of application No. 15/925,638, filed on Mar. 19, 2018, now Pat. No. 10,274,997.

(30) Foreign Application Priority Data

Mar. 24, 2017 (CN) ............. 2017 2 0296583 U

(51) Int. Cl.
*G06F 1/16* (2006.01)
*H04M 1/02* (2006.01)

(52) U.S. Cl.
CPC .......... *G06F 1/1681* (2013.01); *G06F 1/1616* (2013.01); *G06F 1/1652* (2013.01);
(Continued)

(58) Field of Classification Search
CPC .................. G06F 1/1681; G06F 1/1616
See application file for complete search history.

(56) References Cited

U.S. PATENT DOCUMENTS

| | | | |
|---|---|---|---|
| 2011/0063783 A1* | 3/2011 | Shim ................. | G06F 1/1615 361/679.01 |
| 2016/0090763 A1 | 3/2016 | Hsu et al. | |

(Continued)

FOREIGN PATENT DOCUMENTS

| | | |
|---|---|---|
| CN | 104345786 A | 2/2015 |
| CN | 105530340 A | 4/2016 |

(Continued)

OTHER PUBLICATIONS

European Search Report issued in corresponding European Application No. 18162590.6, dated Jun. 28, 2018 (8 pages).

(Continued)

*Primary Examiner* — Tuan H Nguyen
(74) *Attorney, Agent, or Firm* — Ladas & Parry LLP

(57) ABSTRACT

A hinge assembly is provided. The hinge assembly includes a first base, a second base, a flexible connection element, and a number of hinge elements. The flexible connection element is located between and coupled to the first base and the second base. The hinge elements are arranged in a line and located between the first base and the second base. Each of the hinge elements comprises an interior portion and an exterior portion opposite to the interior portion. The exterior portions of the hinge elements are coupled to the flexible connection element. The interior portions of the hinge elements are capable of being either close to or far away from each other by rotating the first base with respect to the second base. A foldable mobile terminal and a rotation mechanism are also provided.

20 Claims, 11 Drawing Sheets

(52) U.S. Cl.
CPC ......... *H04M 1/022* (2013.01); *H04M 1/0216* (2013.01); *H04M 1/0243* (2013.01); *H04M 1/0268* (2013.01)

(56) References Cited

U.S. PATENT DOCUMENTS

| | | |
|---|---|---|
| 2016/0179236 A1 | 6/2016 | Shin et al. |
| 2016/0187935 A1 | 6/2016 | Tazbaz et al. |
| 2017/0061836 A1* | 3/2017 | Kim .................. G09F 9/301 |

FOREIGN PATENT DOCUMENTS

| | | |
|---|---|---|
| CN | 206559426 U | 10/2017 |
| EP | 2674043 A1 | 5/2015 |

OTHER PUBLICATIONS

International Search Report issued in corresponding International application No. 2018079024, dated May 30, 2018 (10 pages).

\* cited by examiner

HINGE ASSEMBLY, ROTATION MECHANISM AND FOLDABLE MOBILE TERMINAL

CROSS-REFERENCE TO RELATED APPLICATION

This application is a continuation application of U.S. patent application Ser. No. 15/925,638, filed on Mar. 19, 2018, which claims priority to a Chinese application No. 201720296583.6 filed on Mar. 24, 2017, titled "ROTATION MECHANISM, FOLDABLE DISPLAY PANEL ASSEMBLY AND FOLDABLE MOBILE TERMINAL". The entireties of the above-mentioned applications are hereby incorporated by reference herein.

TECHNICAL FIELD

The present disclosure relates to the field of consumer electronics in general. More particularly, and without limitation, the disclosed embodiments relate to a hinge assembly, and a rotation mechanism, and a foldable mobile terminal.

BACKGROUND

Mobile phones with large screen play an excellent role in improving user experience and visual effect, and possess obvious advantages particularly in business communication, playing games, watching movies and the like.

Currently, a foldable mobile phone may satisfy demand of a user for larger screen. The foldable mobile phone may have a large flexible display panel. The large flexible display panel is mounted on a first housing and a second housing. The first housing and the second housing can be rotatably coupled to each other by a rotation mechanism. The foldable mobile phone can be folded and unfolded by rotating the rotation mechanism between the first housing and the second housing. Therefore, a hinge assembly configured to connect the first housing and the second housing is needed.

SUMMARY

In accordance with an aspect, in one embodiment of the present disclosure, a hinge assembly is provided. The hinge assembly includes a first base, a second base, a flexible connection element, and a number of hinge elements. The flexible connection element is located between and coupled to the first base and the second base. The hinge elements are arranged in a line and located between the first base and the second base. Each of the hinge elements comprises an interior portion and an exterior portion opposite to the interior portion. The exterior portions of the hinge elements are coupled to the flexible connection element. The interior portions of the hinge elements are capable of being either close to or far away from each other by rotating the first base with respect to the second base.

In accordance with another aspect, in one embodiment of the present disclosure, a foldable mobile terminal is provided. The foldable mobile terminal includes a rotation mechanism, a first housing, a second housing, and a flexible display panel assembly. The rotation mechanism includes a supporting member and at least one hinge assembly. The supporting member has a supporting surface and a mounting surface opposite to the supporting surface. The at least one hinge assembly is coupled to the mounting surface of the supporting member. Each of the at least one hinge assembly having a first base, a second base, a number of hinge elements, and a flexible connection element. Each of the first base and the second base is coupled to the mounting surface and separated from each other. The hinge elements are arranged in a line and located between the first base and the second base. The flexible connection element is located between and coupled to the first base and the second base, and facing the mounting surface member. The first housing is coupled to one side of the supporting member. The second housing is coupled to the other side of the supporting member. The flexible display panel assembly mounted on the first housing and the second housing. The second housing and the rotation mechanism are in contact with the supporting member. A configuration of the supporting member of the rotation mechanism is capable of being changed to cooperate with a configuration of the flexible display panel assembly during rotating the first housing with respect to the second housing.

In accordance with a still another aspect, in one embodiment of the present disclosure, a rotation mechanism is provided. The rotation mechanism includes a supporting member and at least one hinge assembly. The supporting member has a supporting surface and a mounting surface opposite to the supporting surface. The at least one hinge assembly is coupled to the mounting surface of the mounting surface. Each of the at least one hinge assembly has a first base, a second base, a number of hinge elements, and a flexible connection element. Each of the first base and the second base is coupled to the mounting surface and separated from each other. The hinge elements are arranged in a line and located between the first base and the second base. The flexible connection element is located between and coupled to the first base and the second base, and facing the mounting surface member.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION OF EMBODIMENTS

This description and the accompanying drawings that illustrate exemplary embodiments should not be taken as limiting. Various mechanical, structural, electrical, and operational changes may be made without departing from the scope of this description and the claims, including equivalents. In some instances, well known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

As used herein, a "communication terminal" (or simply a "terminal") includes, but is not limited to, a device that is configured to receive/transmit communication signals via a wireline connection, such as via a public-switched telephone network (PSTN), digital subscriber line (DSL), digital cable, a direct cable connection, and/or another data connection/network, and/or via a wireless interface with, for example, a cellular network, a wireless local area network (WLAN)1 a digital television network such as a DVB-H network, a satellite network, an AM/FM broadcast transmitter, and/or another communication terminal. A communication terminal that is configured to communicate over a wireless interface may be referred to as a "wireless communication terminal," a "wireless terminal" and/or a "mobile terminal." Examples of mobile terminals include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

Figure 1:
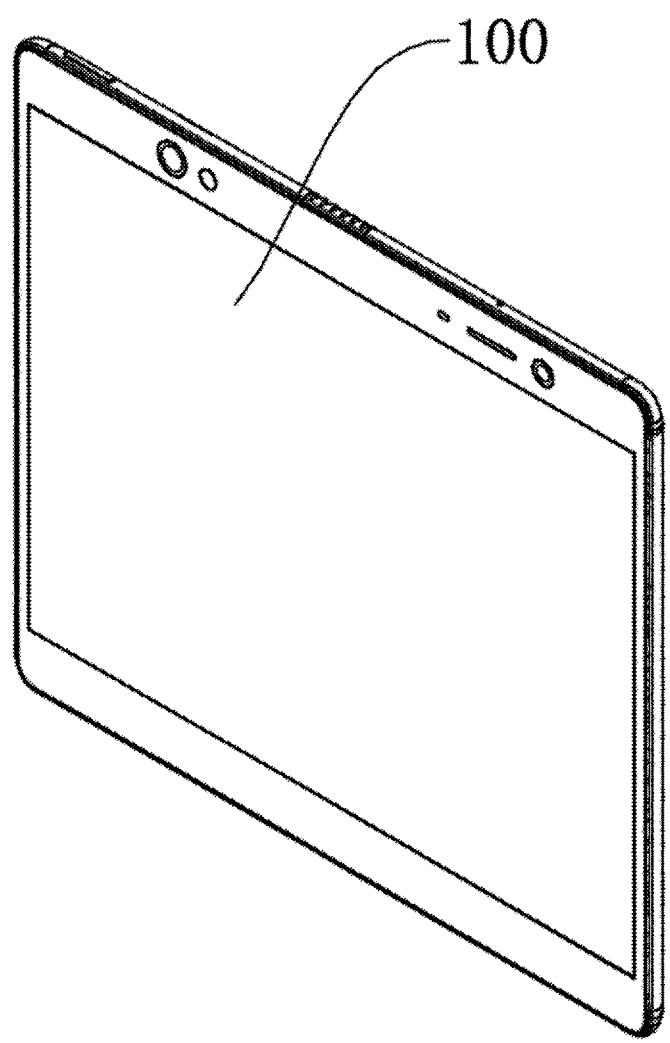
FIG. 1 illustrates a schematic view of a mobile terminal, which is in an unfolded configuration.
Figure 2:
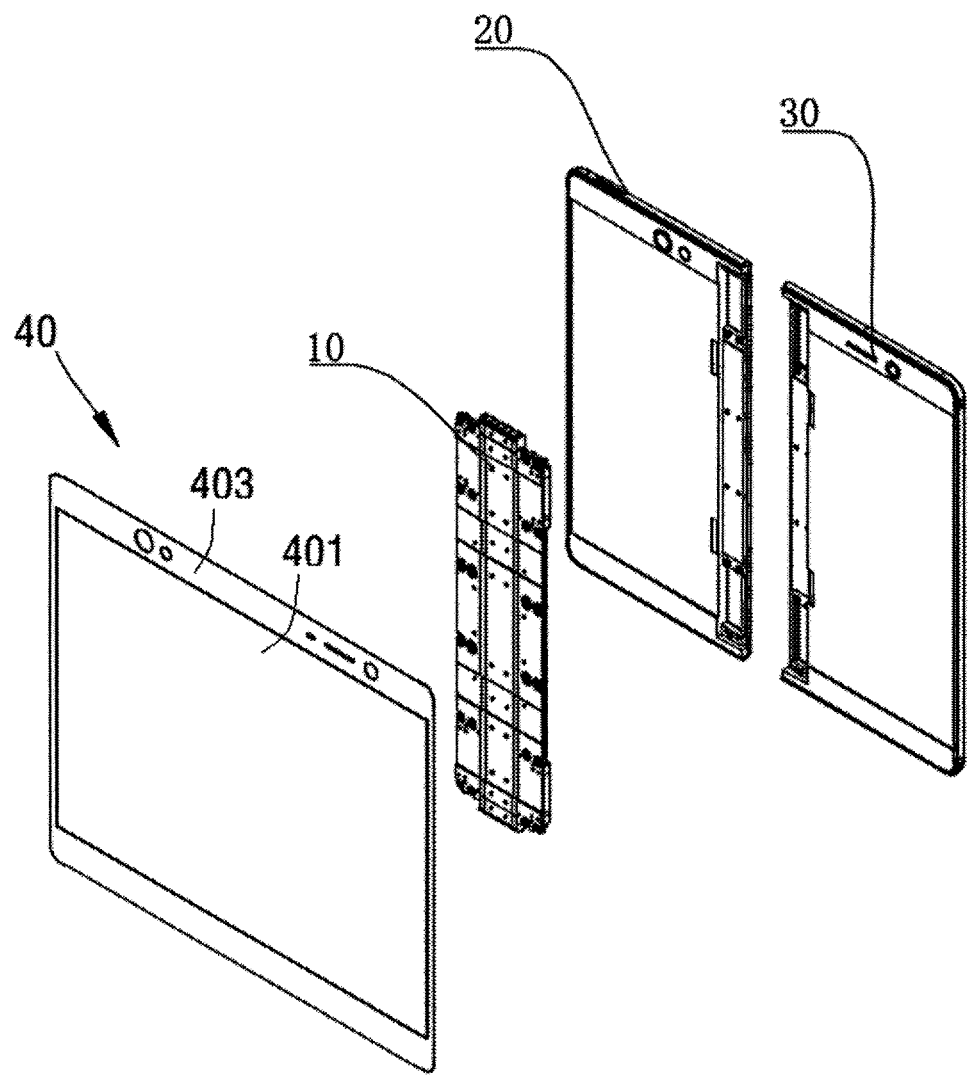
FIG. 2 illustrates an exploded view of the foldable mobile terminal in FIG. 1.
Figure 3:
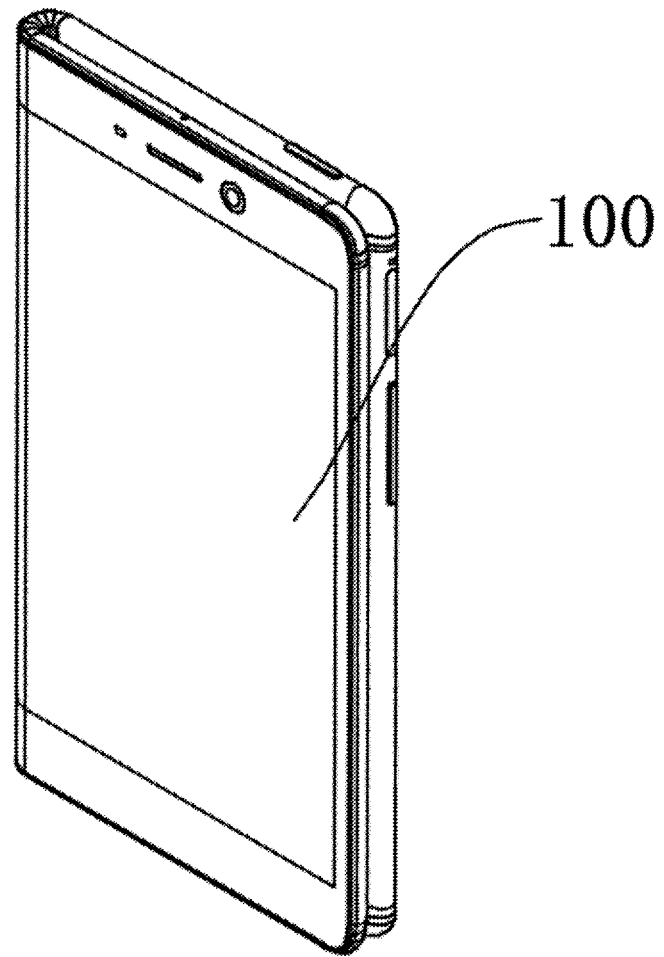
FIG. 3 illustrates a schematic view of the foldable mobile terminal in FIG. 1, which is in a folded configuration.

As illustrated in FIG. 1, FIG. 2, and FIG. 3, a foldable mobile terminal 100 can include a rotation mechanism 10, a first housing 20, a second housing 30, and a flexible display panel assembly 40. The rotation mechanism 10 can be located between the first housing 20 and the second housing 30, and can be configured to couple the first housing 20 to the second housing 30. One side of the rotation mechanism 10 is coupled to the first housing 20, and the other side of the rotation mechanism 10 is coupled to the second housing 30. The second housing 20 can be rotated with respect to the first housing 10 by the rotation mechanism 30. Thus, the foldable mobile terminal 100 can be in an unfolded configuration (see FIG. 1) or a folded mold (see FIG. 3). In the unfolded configuration, the first housing 10 and the second housing 20 are substantially arranged in a plane. In the folded configuration, the second housing 20 is rotated with respect to the first housing 10, and then is turned over and stacked onto the first housing 10. The rotation mechanism 30 is also configured to prevent a detachment of the first housing 20 and the second housing 30. The flexible display panel assembly 40 can be mounted on the first housing 20, the rotation mechanism 10, and the second housing 30. It is noted that, the foldable mobile terminal 100 can further include an electronic component group (not shown). The electronic component group can be received in the first housing 20, and/or the second housing 30. The electronic component group can be electrically coupled to the flexible display panel assembly 40. The electronic component group can be configured to control the flexible display panel assembly 40.

The first housing 20 can be rotated with respect to the second housing 30 by the rotation mechanism 10. The rotation mechanism 10 of the foldable mobile terminal 100 in the folded configuration can support the flexible display panel assembly 40. The rotation mechanism 10 of the foldable mobile terminal 100 in the unfolded configuration can also support the flexible display panel assembly 40. The rotation mechanism 10 can be configured to always support the flexible display panel assembly 40 during rotating the first housing 20 with respect to the second housing. In one embodiment, the rotation mechanism 10 can be folded. The rotation mechanism 10 is folded while the foldable mobile terminal 100 is in the folded configuration. The rotation mechanism 10 is unfolded while the foldable mobile terminal 100 is in the unfolded configuration. Thus, the flexible display panel assembly 40 can be supported effectively by the rotation mechanism 10 and will not be compressed or stretched. The flexible display panel assembly 40 can be prevented from deformation and damage, a service life of the foldable mobile terminal 100 can be prolonged.

Figure 4:
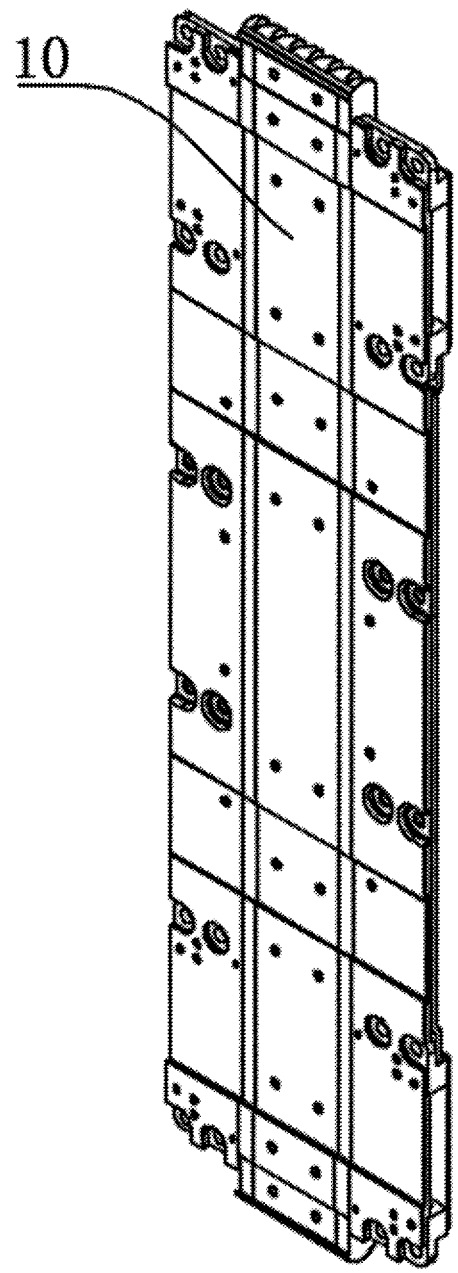
FIG. 4 illustrates a schematic view of a rotation mechanism of the foldable mobile terminal in FIG. 1.
Figure 5:
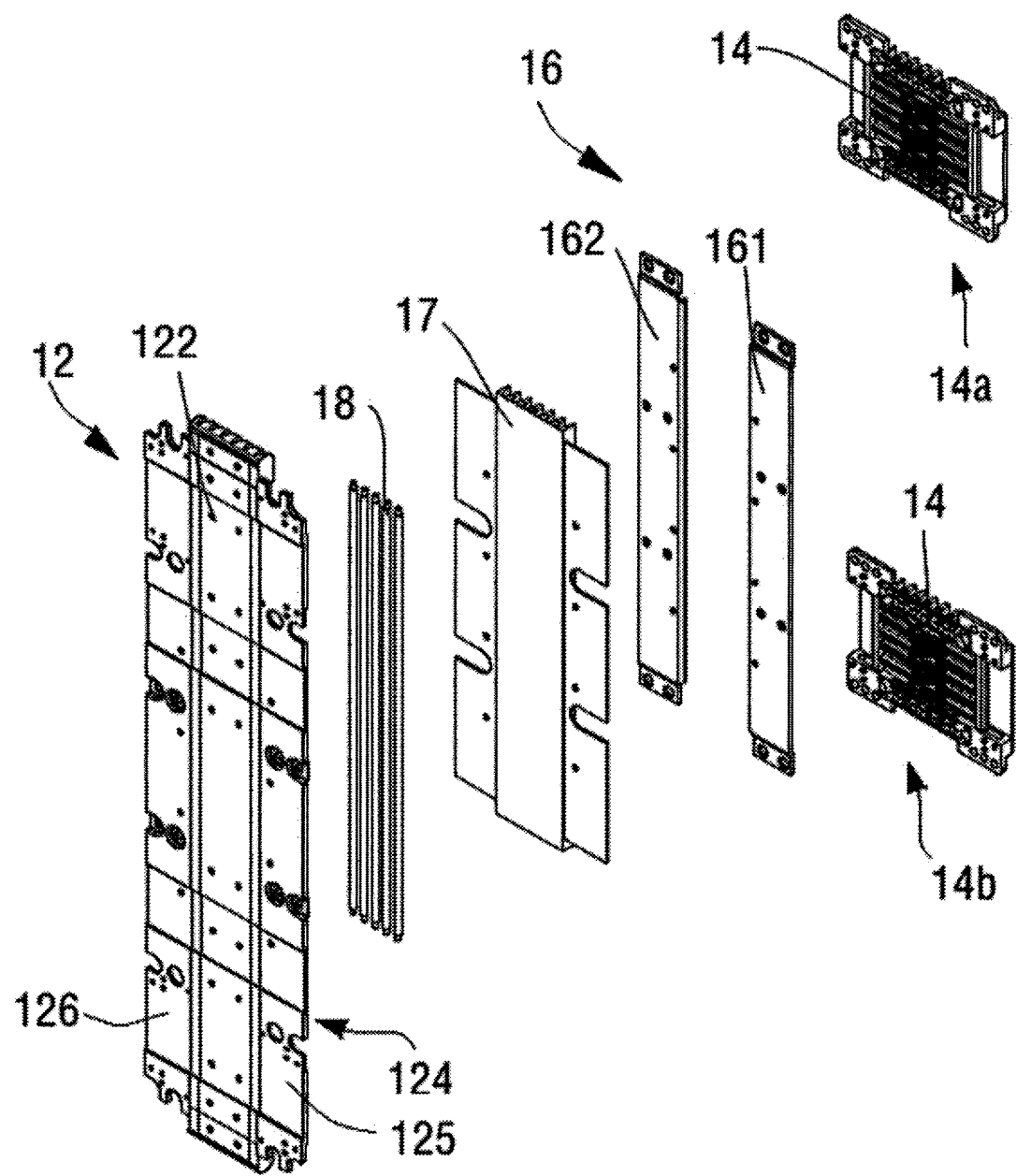
FIG. 5 illustrates an exploded view of the rotation mechanism in FIG. 4.

As illustrated in FIG. 4, and FIG. 5, the rotation mechanism 10 can include a supporting member 12 and at least one hinge assembly 14 coupled to the supporting member 12.

The supporting member 12 can be flexible. For example, the supporting member 12 can be bendable, or even foldable. Thus, the supporting member 12 can be deformed into a predetermined configuration to support the flexible display panel assembly 40. The supporting member 12 may include a supporting surface 122 and a mounting surface 124. The supporting surface 122 of the supporting member 12 can be in contact with the flexible display panel assembly 40 and configured to support the flexible display panel assembly 40. The mounting surface 124 of the supporting member 12 can be configured to be coupled to the hinge assembly 14. In one embodiment, the supporting member 12 can be substantially stripe-shaped, and can be made of thin steel sheet. The supporting member 12 can include a first side 125 and a second side 126. The first side 125 and the second side 126 are arranged along a direction perpendicular to a longitudinal direction of the supporting member 12. The supporting member 12 can be located between the first housing 20 and the second housing 30. The first side 125 can be coupled to the first housing 20 and the second side 126 can be coupled to the second housing 30. The supporting member 12 can be bent or folded by rotating the first housing 20 with respect to the second housing 30 during folding the foldable mobile terminal 100, and the supporting member 12 can also unfolded by rotating the first housing 20 with respect to the second housing 30 during unfolding the foldable mobile terminal 100.

The hinge assembly 14 can be mounted on the mounting surface 124 of the supporting member 12. The hinge assembly 14 can be bent together with the supporting member 12. The hinge assembly 14 can be configured to support the supporting member 12. Especially, the hinge assembly 14 can be configured to support the supporting member 12 to maintain a bent configuration of the supporting member 12. The hinge assembly 14 can be coupled to the first side 125 and the second side 126 of the supporting member 12. A configuration of the supporting surface 122 of the supporting member 12 of the rotation mechanism 10 can be changed to cooperate with a configuration of the flexible display panel assembly 40 during rotating the first housing 20 with respect to the second housing 30. In one embodiment, one end of the hinge assembly 14 can be coupled to the first side 125 of the supporting member 12, and the other end of the hinge assembly 14 can be coupled to the second side 126 of the supporting member 12. In one embodiment, a configuration of the supporting member 12 of the foldable mobile terminal 100 in the folded configuration can be substantially semi-cylinder. The hinge assembly 14 coupled to the supporting member 12 can support the supporting member 12 to maintain the semi-columnar configuration of the supporting member 12.

Figure 6:
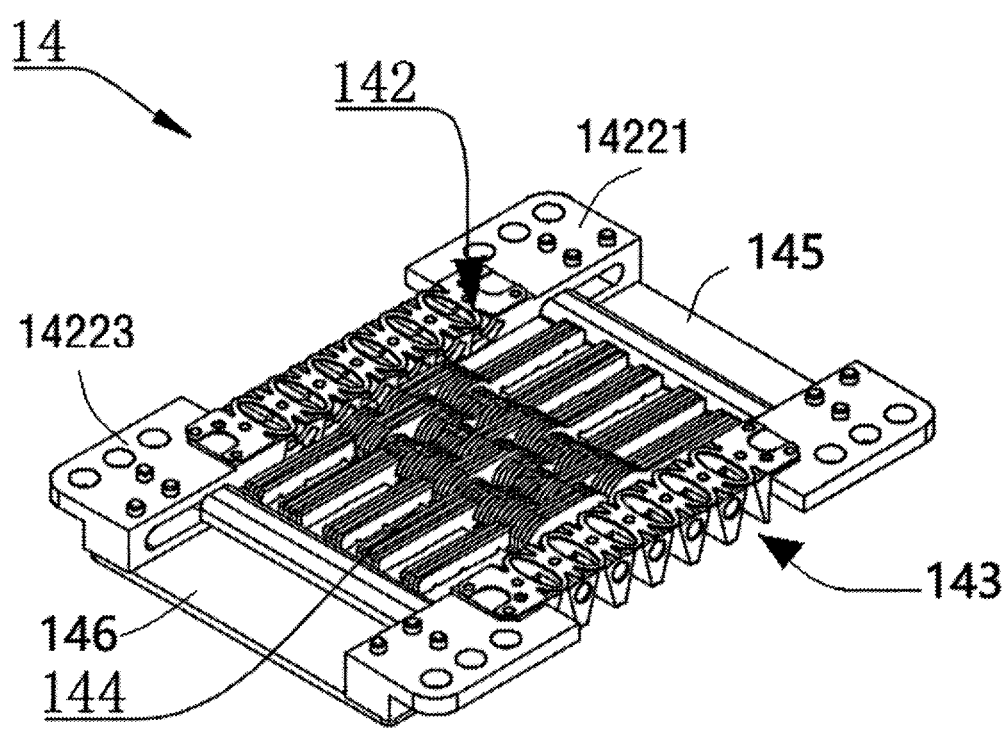
FIG. 6 illustrates a schematic view of a hinge assembly of the rotation mechanism in FIG. 5.
Figure 7:
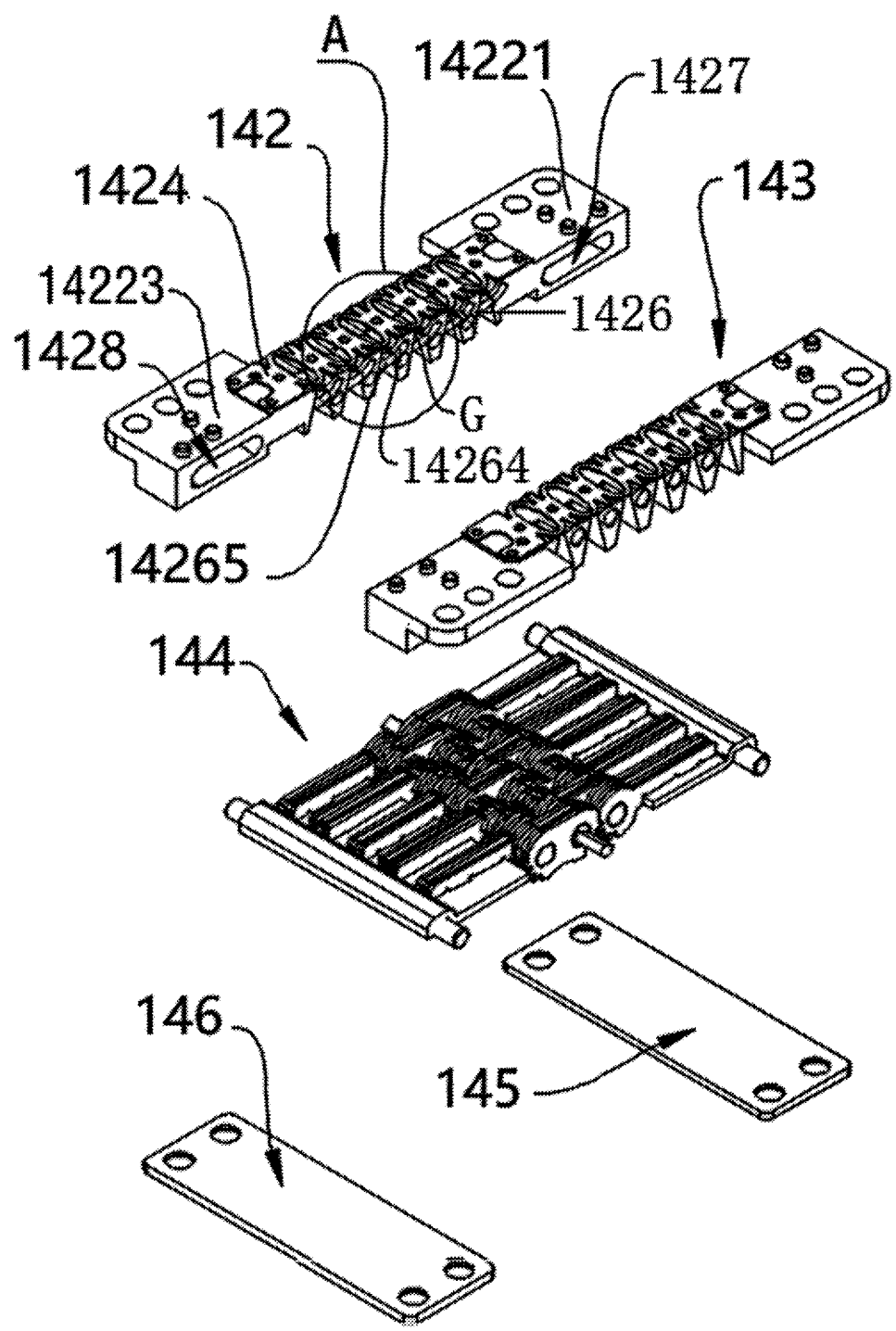
FIG. 7 illustrates an exploded view of the hinge assembly in FIG. 6.

As illustrated in FIG. 6 and FIG. 7, in one embodiment, the hinge assembly 14 can include a first hinge member 142, a second hinge member 143, a tooth plate member 144 located between the first hinge member 142 and the second hinge member 143. The first hinge member 142 and the second hinge member 142 are separated from each other. The hinge assembly 14 can further include a first connection plate 145 and a second connection plate 146. The first connection plate 145 and the second connection plate 146 are separated from each other and located between the first hinge member 141 and the second hinge member 143. In other words, the first hinge member 142 is coupled to the second hinge member 143 by the first connection plate 145 and the second connection plate 146. The tooth plate member 144 is located between the first hinge member 142 and the second hinge member 143, and also between the first connection plate 145 and the second connection plate 146. The tooth plate member 144 can be coupled to the first hinge member 142 and the second hinge member 143, and disposed on the first connection plate 145 and the second connection plate 146.

The second hinge member 143 is substantially similar to the first hinge member 142. As illustrated in FIG. 6, FIG. 7, FIG. 8 and FIG. 9, each of the first hinge member 142 and the second hinge member 143 can include a first base 14221, a second base 14223, a flexible connection element 1424, and a number of hinge elements 1426. In one embodiment, the first base 14221 can be configured to be coupled to the first connection plate 145, and the second base 14223 can be configured to be coupled to the second connection plate 146. The first base 14221 can also be configured to be coupled to the first side 125 of the supporting member 12. The second base 14223 can also be configured to be coupled to the second side 126 of the supporting member 12. The flexible connection element 1424 can be located between the first base 14221 and the second base 14223. One end of the flexible connection element 1424 can be coupled to the first base 14221 and the other end of the flexible connection element 1424 can be coupled to the second base 14223. The flexible connection element 1424 can be substantially strip-shaped, and can be made of a thin steel plate.

The flexible connection element 1424 can be configured to be coupled to the hinge elements 1426. In one embodiment, the flexible connection element 1424 can define a number of position holes 14242 (see FIG. 10) and a number of hollowed-outs 14244 (see FIG. 10). The positioning holes 14242 and the hollowed-outs 14242 are arranged alternatively along a longitudinal direction of the flexible connection element 1424. Each of the hollowed-outs 14244 can be defined between two adjacent position holes 14242. In other words, each of the position holes 14242 can be located between two adjacent hollowed-outs 14244. The formation of the hollowed-outs 14244 can reduce a weight of the flexible connection element 1424. Further, a flexibility of the flexible connection element 1424 can be enhanced due to the hollowed-outs 14244. In one embodiment, a configuration of each of the hollowed-outs 14244 can be substantially ellipse-shaped. A configuration of each of the position holes 14242 can be substantially circle-shaped. Centers of the hollowed-outs 14244 and centers of the position holes 14242 can be arranged in a line.

The hinge elements 1426 can be located between the first base 14221 and the second base 14223. The hinge elements 1426 can be arranged in a line and coupled to the flexible connection element 1424.

Figure 10:
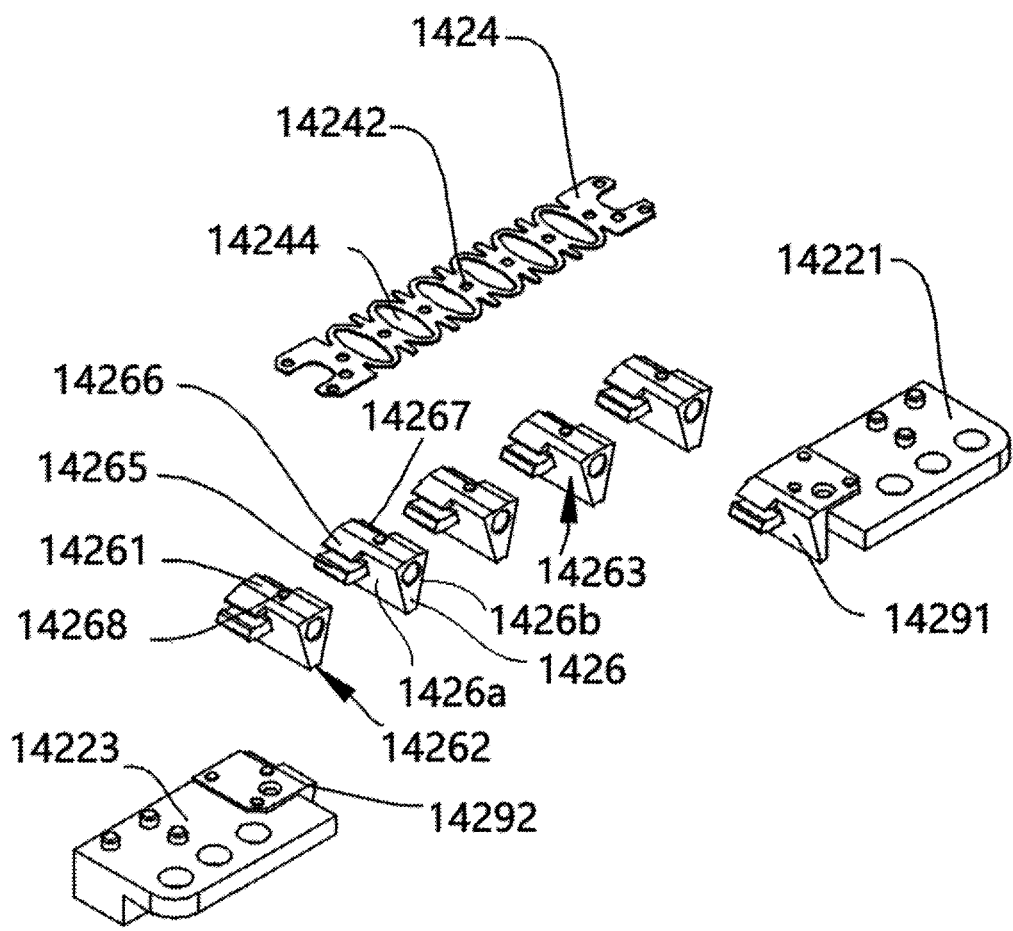
FIG. 10 illustrates an exploded view of the first hinge member (or the second hinge member in FIG. 6.

In one embodiment, as illustrated in FIG. 10, each of the hinge elements 1426 can include an exterior portion 14261 and an interior portion 14262 opposite to the interior portion 14261. The hinge elements 1426 can be coupled to the flexible connection element 1424 by the exterior portions 14261. In one embodiment, the exterior portion 14261 may have a position rod 14268 formed thereon. The position rod 14268 can be coupled to the corresponding position hole 14242 of the flexible connection element 1424. Thus, the exterior portions 14261 of the hinge elements 1426 can be coupled to the flexible connection element 1424, and the interior portion 14261 can be capable of being either close to or far away from each other by rotating the first base 14221 with respect to the second base 14223.

Figure 8:
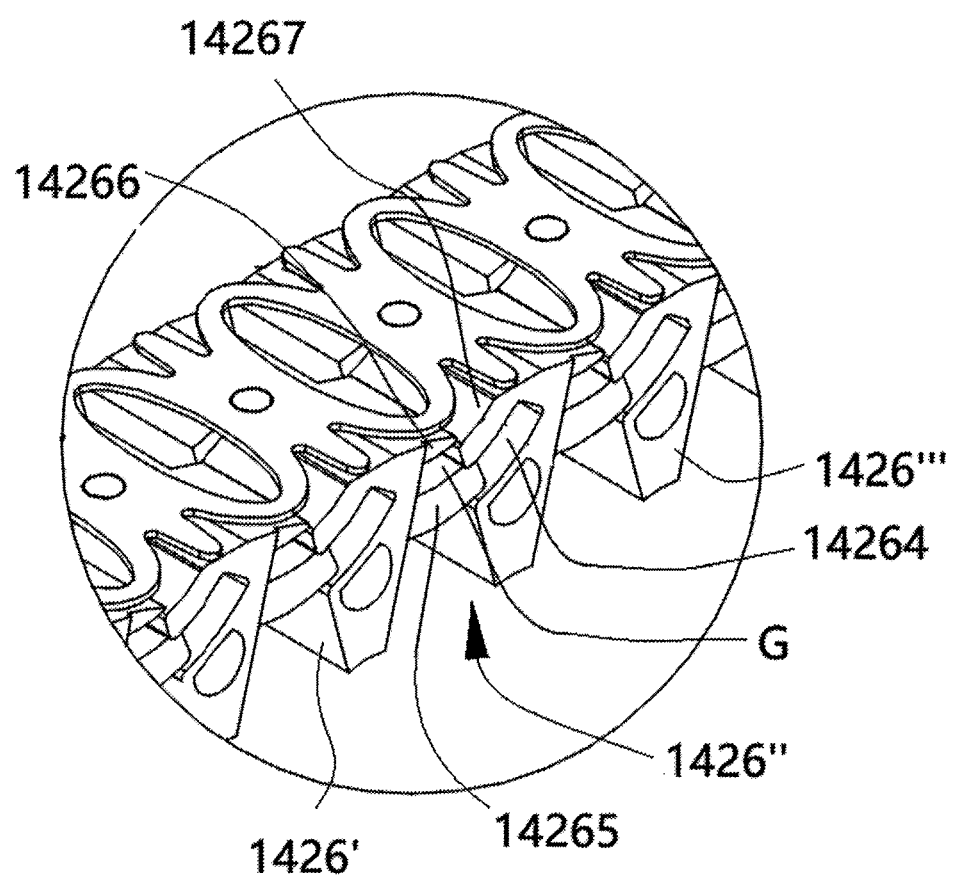
FIG. 8 illustrates an enlarged view of part A in FIG. 7.

As illustrated in FIG. 7, FIG. 8 and FIG. 10, each of the hinge elements 1426 can further include a hinge body 14263. In one embodiment, the hinge body 14263 can be substantially fan-shaped. The hinge body 14263 may have a first sidewall 1426a and a second sidewall 1426b. The first sidewall 1426a and the second sidewall 1426b are located on two opposite sides of the hinge body 14263. A slide portion 14265 and a first extending portion 14266 are located at the same side of the hinge member 1426. For example, the slide portion 14265 and the first extending portion 14266 are located at the first sidewall 1426a of the hinge element 1426. Thus, a guiding space G can be formed between the slide portion 14265 and the first extending portion 14266. Further, the hinge body 14263 can define a slide slot 14264 at the second sidewall 1426b, thereby forming a second extending portion 14267. In other words, the slide slot 14264 and the slide portion 14265 can be located at two opposite sidewalls of the hinge body 14263 of the hinge element 1426. The slide slot 14264 and the second extending portion 14267 are located at the same side of the hinge body 14263 of the hinge element 1426. The slide portion 14265 of one of the hinge members 1426 can be coupled to and slide in the slide slot 14264 of another hinge element 1426 adjacent to the one hinge element 1426. The second extending portion 14267 of one of the hinge elements 1426 can be coupled to and slide in the guiding space G of another hinge element 1426 adjacent to the one hinge element 1426.

In one embodiment, as illustrated in FIG. 7 and FIG. 8, the first hinge member 142 may include a first hinge element 1426', a second hinge element 1426" adjacent to the first hinge element 1426', and a third hinge element 1426' adjacent to the second hinge element 1426". The second hinge element 1426" can be located between the first hinge element 1426' and the third hinge element 1426'". The slide slot 14264 of the second hinge element 1426" can be located at the second sidewall 1426b facing the first hinge element 1426', the slide portion 14265 of the second hinge element 1426" can be located at the first sidewall 1426a facing the third hinge element 1426'. The slide portion 14265 of the second hinge element 1426″ can be inserted into the slide slot 14264 of the third hinge element 1426‴. The slide portion 14265 of the second hinge element 1426″ can slide towards the third hinge element 1426‴ in the slide slot 14264 of the third hinge element 1426‴, or slide away from the third hinge element 1426‴ in the slide slot 14264 of the third hinge element 1426‴. Correspondingly, the second extending portion 14267 of the third hinge element 1426‴ can be inserted in a guiding space G of the second hinge element 1426″. The second extending portion 14267 of the third hinge element 1426‴ can slide towards the second hinge element 1426″ in the guiding space G of the second hinge element 1426″ or slide away from the second hinge element 1426″ in the guiding space G of the second hinge element 1426″. The slide portion 14265 of the first hinge element 1426′ can be inserted into the slide slot 14264 of the second hinge element 1426″. The slide portion 14265 of the first hinge element 1426′ can slide towards the second hinge element 1426″ in the slide slot 14264 of the second hinge element 1426″, or slide away from the second hinge element 1426″ in the slide slot 14264 of the second hinge element 1426″. Correspondingly, the second extending portion 14267 of the second hinge element 1426″ can be inserted in a guiding space G of the first hinge element 1426′. The second extending portion 14267 of the second hinge element 1426″ can slide towards the first hinge element 1426′ in the guiding space G of the first hinge element 1426′ or slide away from the first hinge element 1426′ in the guiding space G of the first hinge element 1426′.

In one embodiment, the slide portion 14265 can be substantially arc-shaped. Correspondingly, a configuration of the slide slot 14264 can be arc-shaped and similar to that of the slide portion 14265. The slide slot 14264 is configured to be coupled to the slide slot 14264. Thus, the slide portion 14265 can slide in the slide slot 14264.

In one embodiment, a surface of the exterior portion 14261 of the hinge element 1426 can be substantially an arc-shaped surface. During rotating the first housing 20 with respect to the second housing 30, the first base 14221 can be rotated with respect to the second base 14223 and stacked on the second base 14223. Thus, the first hinge member 142 can be bent by sliding the slide portion 14265 into the slide slot 14264 and sliding the second extending portion 14267 into the guiding space G. As a result, the surfaces of the exterior portions 14261 of the hinge elements 1426 can form an outer surface. The outer surface may have a configuration similar to the folded flexible display panel assembly 40. The outer surface can be in contact with the flexible connection element 1424 to change a configuration of the supporting surface of the flexible connection element 1424. Thus, the flexible display panel assembly 40 can be supported effectively. In one embodiment, the flexible display panel assembly 40 may be folded to have a configuration of semi-cylinder. The outer surface formed by the first hinge member 142 may be a semi-circumferential surface coupled to the folded flexible display panel assembly 40.

Figure 9:
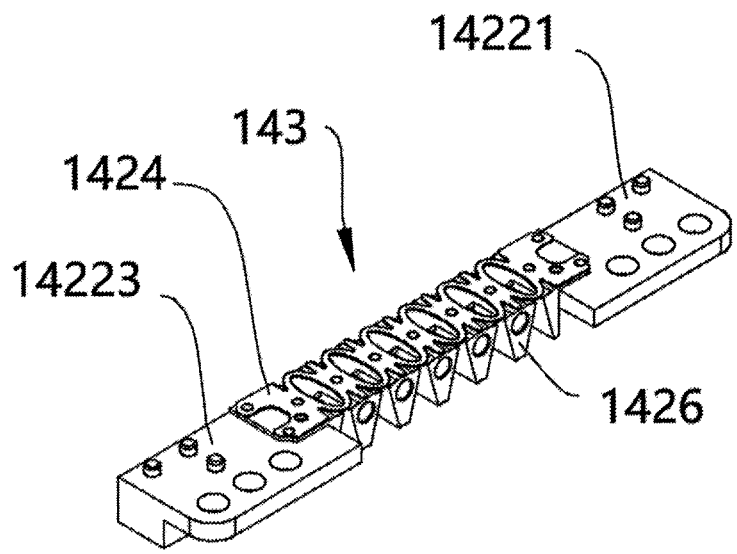
FIG. 9 illustrates a schematic view of a first hinge member (or a second hinge member) of the hinge assembly in FIG. 6.

In one embodiment, an amount of the hinge elements 1426 can be an odd number. A middle one of the hinge elements 1426 can be configured to indicate a center axis of the rotation mechanism 10. As illustrated in FIG. 9 and FIG. 10, in the present embodiment, five hinge elements 1426 arranged in a line are illustrated. The first hinge member 142 may further include a first connecting hinge element 14291 and a second connecting hinge element 14292. The first connecting hinge element 14291 is located at one end of the first hinge member 142 and is configured to be fixed to the first base 14221. The second connecting hinge member 14292 is located at the other end of the first hinge member 142 and is configured to be fixed to the second base 14223. The first connecting hinge element 14292 may have a slide portion and a first extending portion. A guiding space G can be formed between the slide portion and the first extending portion. The slide portion can be coupled to the slide slot of the hinge element 1426 adjacent to the first connecting hinge element 14291. The second extending portion of the hinge element 1426 adjacent to the second connecting hinge element 14291 can be inserted in the guiding space G of the first connecting hinge element 14291. The second connecting hinge element 14292 may have a slide slot to be coupled to the slide portion of the hinge element 1426 adjacent to the second connecting hinge element 14292. A second extending portion of the second connecting hinge element 14292 can be inserted in the guiding space G of the hinge element 1426 adjacent to the second connecting hinge element 14292. Thus, by rotating the first base 14221 with respect to the second base 14223 (i.e., by rotating the first housing 20 with respecting to the second housing 30), the first hinge member 142 can be bent, thereby changing the configuration of the supporting surface 122 of the rotation mechanism.

The second hinge member 143 (see FIG. 9) is substantially similar to the first hinge member 142. The second hinge member 143 is substantially parallel to the first hinge member 142. By rotating the first base 14221 with respect to the second base 14223 (i.e., by rotating the first housing 20 with respecting to the second housing 30), the second hinge member 142 can be bent, thereby changing the configuration of the supporting surface 122 of the rotation mechanism.

Figure 11:
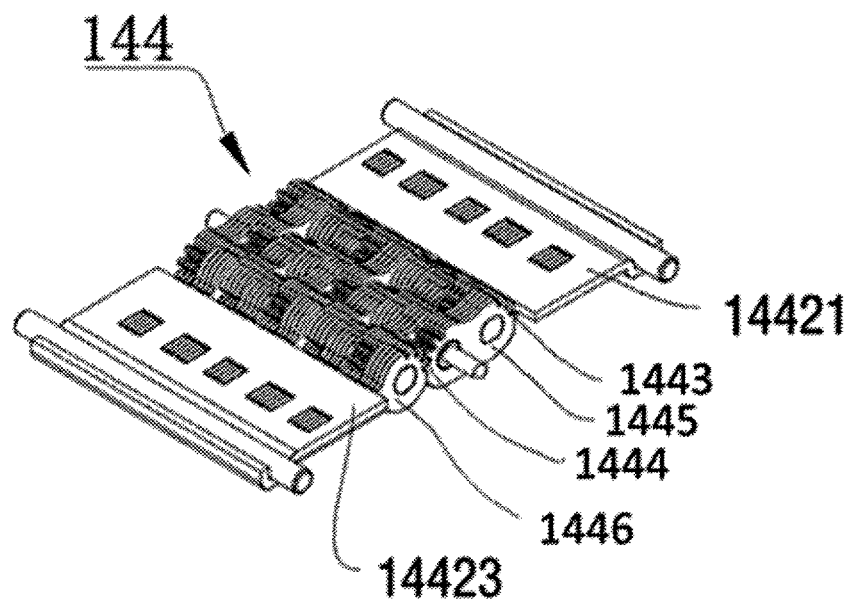
FIG. 11 illustrates a schematic view of the tooth plate assembly in FIG. 7.
Figure 12:
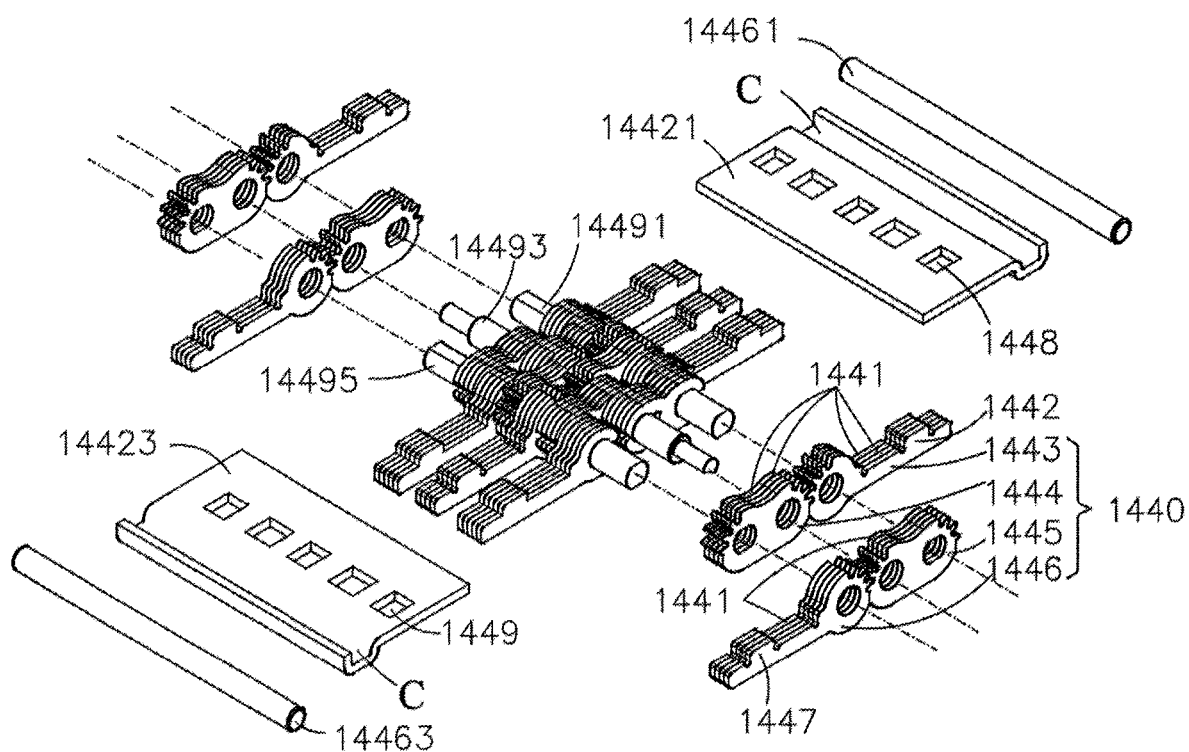
FIG. 12 illustrates an exploded view of the tooth plate assembly in FIG. 11.

As illustrated in FIG. 7, FIG. 11 and FIG. 12, the tooth plate member 144 is located between the first hinge member 142 and the second hinge member 143. The tooth plate member 144 may include a first mounting plate 14421, a second mounting plate 14423, and at least one tooth plate group 1440. The first mounting plate 14421 and the second mounting plate 14423 can be parallelly arranged in a plane and separated from each other. One end of the first mounting plate 14421 can be coupled to the first bases 14221 of the first hinge member 142 and the second hinge member 143, the other end of the first mounting plate 14421 can be coupled to the tooth plate group 1440. One end of the second mounting plate 14423 can be coupled to the second bases 14223 of the first hinge member 142 and the second hinge member 143, the other end of the first mounting plate 14423 can be coupled to the tooth plate group 1440.

The tooth plate group 1440 can be located between and coupled to the first mounting plate 14421 and the second mounting plate 14423. In one embodiment, the tooth plate group 1440 may include a first tooth plate group 1443, a second tooth plate group 1446, a first middle tooth plate group 1444, and a second middle tooth plate group 1445. Each of the first tooth plate group 1443, the second tooth plate group 1446, and the first middle tooth plate group 1444, and the second tooth plate group 1445 can include a number of tooth plates 1441. The first tooth plate group 1443 can be coupled to the first mounting plate 14421. One end far away from the first mounting plate 14421 of the first tooth plate group 1443 can be meshed with the first middle tooth plate group 1444. The second tooth plate group 1446 can be coupled to the second mounting plate 14423. One end far away from the second mounting plate 14423 of the second tooth plate group 1446 can be meshed with the second middle tooth plate group 1445. The first tooth plate group 1443 and the first middle tooth plate group 1444 can be substantially stacked on the second middle tooth plate group 1445 and the second tooth plate group 1446. Thus, the first middle tooth plate group 1444 can be rotatably coupled to the first tooth plate group 1443, and the second middle tooth plate group 1445 can be rotatably coupled to the second tooth plate group 1446. The second mounting plate 14423 can be rotated relative to the first mounting plate 14421 by the tooth plate group 1440. A rotation angle of the first mounting plate 14421 with respect to the second mounting plate can be any degree. The tooth plate group 1440 can be configured to maintain a rotation position of the first bases 14421 of the first hinge member 142 and the second hinge member 143 with respect to the second bases 14423 of the first hinge member 142 and the second hinge member 143. In other words, a position of the first bases 14421 of the first hinge member 142 and the second hinge member 143 with respect to the second bases 14423 of the first hinge member 142 and the second hinge member 143 can be maintained by the tooth plate group 1440.

In one embodiment, the tooth plate member 144 may include a number of tooth plate groups 1440. The tooth plate groups 1440 are stacked along a direction parallel to the rotation axis of the rotation mechanism 10. In the present embodiment, five stacked tooth plate groups 1440 are illustrated in FIG. 12. In one embodiment, a first rotation shaft 14491 can penetrate through the first tooth plate groups 1443 and the second middle tooth plate groups 1445, a second rotation shaft 14493 can penetrate through the first middle tooth plate groups 1444 and the second middle tooth plate groups 1445, and a third rotation shaft 14495 can penetrate through the first middle tooth plate groups 1444 and the second tooth plate groups 1446. Therefore, the tooth plate groups 1440 can be folded and unfolded during rotating the first tooth plate groups 1443 and the second tooth plate groups 1445. The tooth plate groups 1440 can be configured to maintain a rotation position of the first bases 14421 of the first hinge member 142 and the second hinge member 143 with respect to the second bases 14423 of the first hinge member 142 and the second hinge member 143.

In one embodiment, the first tooth plate group 1443 can include a number of first mounting protrusions 1442 on a surface facing the first mounting plate 14421. The first mounting plate 14421 can define a number of first mounting holes 1448 corresponding to the first mounting protrusions 1442. The first mounting protrusions 1442 can be inserted into the first mounting holes 1448 one by one. Thus, the first tooth plate group 1443 can be coupled to the first mounting plate 14421.

In one embodiment, the second tooth plate group 1446 can include a number of second mounting protrusions 1447 on a surface facing the second mounting plate 14423. The second mounting plate 14423 can define a number of second mounting holes 1449 corresponding to the second mounting protrusions 1447 of the second tooth plate group 1446. The second mounting protrusions 1447 can be inserted into the second mounting holes 1449 one by one. Thus, the second tooth plate group 1446 can be coupled to the second mounting plate 14423.

As illustrated in FIG. 6, FIG. 7, FIG. 11 and FIG. 12, the first mounting plate 14421 can be slidably coupled to the first bases 14221; the second mounting plate 14423 can be slidably coupled to the second bases 14223. The first bases 14221 and the second base 14223 can be fixed to the supporting member 12. When the first bases 14221 are rotated relative to the second bases 14223, the flexible connection element 1424 can be bent. The interior portions 14261 of the hinge elements 1426 can be moved close to each other. As a result, a configuration of the supporting surface 122 of the supporting member 12 of the rotation mechanism 10 can be changed to cooperate with a configuration of the flexible display panel assembly 40 during rotating the first housing 20 with respect to the second housing 30. Thus, the rotation mechanism 10 can support the flexible display panel assembly 40 always.

In one embodiment, the tooth plate member 144 can further include a first sliding rod 14461 and a second sliding rod 14463. The first sliding rod 14461 can be mounted on the first mounting plate 14421, and slidably coupled to the first bases 14221. The second sliding rod 14463 can be mounted on the second mounting plate 14423, and slidably coupled to the first bases 14223.

In one embodiment, the first sliding rod 14461 can be located at one side of the first mounting plate 14421 and be far away from the tooth plate groups 1440. Two opposite ends of the first sliding rod 14461 can be protruded from the first mounting plate 14421. The first sliding rod 14461 can be configured to couple to the first bases 14221. The first bases 14221 can define two first guiding slots 1427 (see in FIG. 7). The two ends of the first sliding rod 14461 can be respectively received in the two first guiding slots 1427. The two ends of the first sliding rod 14461 can slide in the two first guiding slots 1427. Thus, the first sliding rod 14461 can be slidably coupled to the first bases 14221. In one embodiment, the first mounting plate 14421 can define a locking slot C. The first sliding rod 14461 can be partially received in the locking slot C. Thus, the first sliding rod 14461 can be mounted on the first mounting plate 14421.

In one embodiment, the second sliding rod 14463 can be located at one side of the second mounting plate 14423 and be far away from the tooth plate groups 1440. Two opposite ends of the second sliding rod 14463 can be protruded from the second mounting plate 14421. The second sliding rod 14463 can be configured to couple to the second bases 14223. The second bases 14221 can define two second guiding slots 1428 (see in FIG. 7). The two ends of the second sliding rod 14463 can be respectively received in the two second guiding slots 1428. The two ends of the second sliding rod 14463 can slide in the two second guiding slots 1428. Thus, the second sliding rod 14463 can be slidably coupled to the second bases 14223. In one embodiment, the second mounting plate 14423 can define a locking slot C. The second sliding rod 14463 can be partially received in the locking slot C. Thus, the second sliding rod 14463 can be mounted on the second mounting plate 14423.

Figure 13:
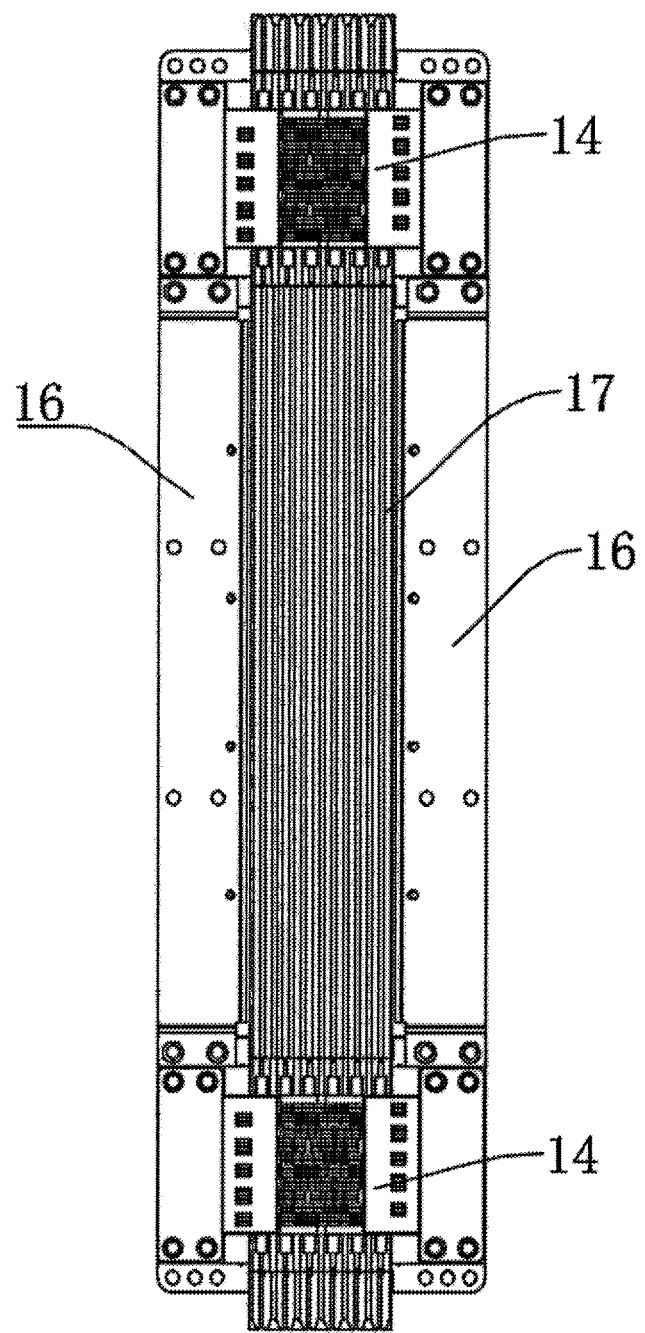
FIG. 13 illustrates an assembly view of the rotation mechanism in FIG. 4.

As illustrated in FIG. 5 and FIG. 13, in the one embodiment, the rotation mechanism 10 may include two hinge assemblies 14 (i.e., a first hinge assembly 14a and a second hinge assembly 14b). The first hinge assembly 14a and the second hinge assembly 14b can be located at two opposite ends of the supporting member 12 along a longitudinal direction of the supporting member 12. The first hinge assembly 14a and the second hinge assembly 14b can be separated from each other. The rotation mechanism 10 can further include a connecting member 16, a flexible decorating member 17, and a number of supporting shafts 18.

In one embodiment, the connecting member 16 may include a first connecting unit 161 and a second connecting unit 162. The first connecting unit 161 and the second connecting unit 162 can be located between the first hinge assembly 14a and the second hinge assembly 14b, and can be substantially parallel and separated from each other. Two ends of each of the first connecting unit 161 and the second connecting unit 162 can be configured to be connected to the first hinge assembly 14a and the second hinge assembly 14b. In one embodiment, two opposite ends of first connecting unit 161 can be coupled to the first bases 14421 of the first hinge assembly 14a and the second hinge assembly 14b, two opposite ends of the second connecting unit 162 can be coupled to the second bases 14423 of the first hinge assembly 14a and the second hinge assembly 14b. In one embodiment, each of the first connecting unit 161 and the second connecting unit 162 may be made of a sheet metal plate. The connecting member 16 can be connected to the first hinge assembly 14a and the second hinge assembly 14b by screw. A middle part of the connecting member 16 (i.e., the first connecting unit 161 and the second connecting unit 162) can be connected to the supporting member 12 by screw. The connecting member 16 can be configured to reinforce the strength of the rotation mechanism 10.

In one embodiment, the flexible decorating member 17 is located between the first connecting unit 161 and the second connecting unit 162, and located between the first tooth hinge assemblies 14a and the second tooth hinge assemblies 14b. The flexible decorating member 17 can be coupled to the supporting member 12. The flexible decorating member 17 can be made of silicone. The flexible decorating member 17 can be configured to decorate the rotation mechanism 10, thus better appearance effect of the rotation mechanism 10 can be obtained.

The supporting rods 18 can be mounted on the flexible decorating member 17. In one embodiment, the supporting rod 18 can be arranged in the flexible decorating member 17. The supporting rods 18 can be substantially parallel to and separated from each other. A longitudinal direction of the supporting rods 18 can be parallel to the rotation axis of the first hinge assembly 14a and the second tooth hinge assemblies 14b. In one embodiment, two opposite ends of each of the supporting rods 18 can be coupled to the first hinge assembly 14a and the second hinge assembly 14b respectively. In an alternative embodiment, the two opposite ends of each of the supporting rods 18 can be close to the first hinge assembly 14a and the second hinge assembly 14b respectively. The flexible decorating member 17 and the supporting rods 18 can be configured to support the supporting member 12, and prevent the supporting member 12 from sinking.

The flexible display panel assembly 40 can include flexible display panel 401 and a flexible cover 403 (see FIG. 2). The flexible cover 403 can be overlapped on and adhered to the flexible display panel 401. The flexible display panel assembly 40 is mounted on the first housing 20, the rotation mechanism 10 and the second housing 30.

The foldable mobile terminal 100 can be folded or unfolded by the rotation mechanism 10. During folding the foldable mobile terminal 100, the interior portions 14262 of the hinge elements 1426 can be close to each other, the supporting member 12 of the rotation mechanism 10 can be bent by the hinge elements 1426. The configuration of the bent supporting member 12 can be similar to the bent (or folded) flexible display panel assembly 40. During unfolding the foldable mobile terminal 100, the interior portions 14262 of the hinge elements 1426 can be far away from each other, the supporting member 12 of the rotation mechanism 10 can be bent by the hinge elements 1426. The configuration of the bent supporting member 12 can be similar to the bent flexible display panel assembly 40. Thus, the rotation mechanism 10 can always support the flexible display panel assembly 40. The flexible display panel assembly 40 will not be stretched or compressed during folding or unfolding the foldable mobile terminal 100. The flexible display panel assembly 40 can be prevented from damage.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A hinge assembly comprising:
a first base;
a second base;
a flexible connection element located between and coupled to the first base and the second base; and
a plurality of hinge elements arranged in a line and located between the first base and the second base, wherein each of the hinge elements comprises an interior portion and an exterior portion opposite to the interior portion, the exterior portions of the hinge elements are coupled to the flexible connection element, the interior portions of the hinge elements are capable of being either close to or far away from each other by rotating the first base with respect to the second base
wherein each of the hinge elements comprises a first sidewall and a second sidewall opposite to the first sidewall; the interior portion and the exterior portion are located between the first sidewall and the second sidewall;
wherein the first sidewall is provided with a slide portion; the second sidewall defines a slide slot; the slide portion of one of the hinge elements is slidably engaged in the slide slot of one hinge element adjacent to the one of the hinge elements;
wherein each of the hinge element defines a guiding space in the first sidewall; each of the hinge elements further comprises a second extending portion adjacent to the slide slot on the second sidewall; the second extending portion of the one of the hinge elements is configured to be slidably engaged in the guiding space of one hinge element adjacent to the one of the hinge elements.

2. The hinge assembly as claimed in claim 1, wherein the slide portion is arc-shaped; a configuration of the slide slot is arc-shaped and similar to that of the slide portion.

3. The hinge assembly as claimed in claim 1, wherein each of the hinge elements further comprises a first extending portion disposed on the first sidewall, thereby forming the guiding space between the slide portion and the first extending portion.

4. The hinge assembly as claimed in claim 1, wherein the exterior portion of each of the hinge elements comprises an outer surface, the outer surface is arc-shaped, a successive configuration of the outer surfaces of the hinge elements is changed during rotating the first base with respect to the second base.

5. The hinge assembly as claimed in claim 1, wherein an amount of the hinge elements is odd number, a middle one of the hinge elements is configured to indicate a rotation axis of the hinge assembly.

6. A hinge assembly comprising:
a first base;
a second base;
a flexible connection element located between and coupled to the first base and the second base;
a plurality of hinge elements arranged in a line and located between the first base and the second base, wherein each of the hinge elements comprises an interior portion and an exterior portion opposite to the interior portion, the exterior portions of the hinge elements are coupled to the flexible connection element, the interior portions of the hinge elements are capable of being either close to or far away from each other by rotating the first base with respect to the second base; and a tooth plate member coupled to the first base and the second base, the tooth plate member comprising:
  a first mounting plate slidably coupled to the first base;
  a second mounting plate slidably coupled to the second base; and
  at least one tooth plate group located between and coupled to the first mounting plate and the second mounting plate, wherein the at least one tooth plate group is configured to maintain a rotation position of the first base with respect to the second base.

7. The hinge assembly as claimed in claim 6, wherein each of the at least one tooth plate group comprises:
  a first tooth plate group coupled to the first mounting plate;
  a second tooth plate group coupled to the second mounting plate;
  a first middle tooth plate group meshed with the first tooth plate group; and
  a second middle tooth plate group meshed with the second tooth plate group, the second tooth plate group and the second middle tooth plate group are stacked on the first tooth plate group and the first middle tooth plate group.

8. The hinge assembly as claimed in claim 7, wherein the at least one tooth plate group comprises a plurality of tooth plate groups, the tooth plate groups are stacked along a direction parallel to a rotation axis of the hinge assembly.

9. The hinge assembly as claimed in claim 6, wherein the tooth plate member further comprises:
  a first rotation shaft, penetrating through the first tooth plate groups and the second middle tooth plate groups;
  a second rotation shaft, penetrating through the first middle tooth plate groups and the second middle tooth plate groups; and
  a third rotation shaft, penetrating through the first middle tooth plate groups and the second tooth plate groups.

10. A foldable mobile terminal, comprising:
  a rotation mechanism comprising:
    a supporting member having a supporting surface and a mounting surface opposite to the supporting surface; and
    at least one hinge assembly coupled to the mounting surface, each of the at least one hinge assembly comprising a first base, a second base, a plurality of hinge elements, and a flexible connection element; wherein each of the first base and the second base is coupled to the mounting surface and separated from each other; the hinge elements are arranged in a line and located between the first base and the second base; the flexible connection element is located between and coupled to the first base and the second base, and faces the mounting surface;
  a first housing coupled to one side of the supporting member;
  a second housing coupled to the other side of the supporting member; and
  a flexible display panel assembly mounted on the first housing and the second housing and being in contact with the supporting surface;
  wherein the second housing and the rotation mechanism are in contact with the supporting member; a configuration of the supporting member of the rotation mechanism is capable of being changed to cooperate with a configuration of the flexible display panel assembly during rotating the first housing with respect to the second housing;
  wherein each of the hinge elements comprises a first sidewall and a second sidewall opposite to the first sidewall, the first sidewall is provided with a slide portion, the second sidewall defines a slide slot; the slide portion of one of the hinge elements is slidably engaged in the slide slot of one hinge element adjacent to the one of the hinge elements;
  wherein each of the hinge element defines a guiding space in the first sidewall; each of the hinge elements further comprises a second extending portion adjacent to the slide slot of the second sidewall; the second extending portion of the one of the hinge elements is configured to be slidably engaged in the guiding space of one hinge element adjacent to the one of the hinge elements.

11. The foldable mobile terminal as claimed in claim 10, wherein each of the hinge elements comprises an interior portion and an exterior portion opposite to the interior portion; the exterior portions of the hinge elements are coupled to the flexible connection element, the interior portions of the hinge elements are capable of being either close to or far away from each other by rotating the first base with respect to the second base.

12. The foldable mobile terminal as claimed in claim 11, wherein the interior portion and the exterior portion are located between the first sidewall and the second sidewall.

13. The foldable mobile terminal as claimed in claim 11, wherein the exterior portion of each of the hinge elements comprises an outer surface, the outer surface is arc-shaped, a successive configuration of the outer surfaces of the hinge elements is changed during rotating the first base with respect to the second base.

14. The foldable mobile terminal as claimed in claim 10, wherein the slide portion is arc-shaped; a configuration of the slide slot is arc-shaped and similar to that of the slide portion.

15. The foldable mobile terminal as claimed in claim 10, wherein the flexible connection element defines a plurality of position holes and a plurality of hollowed-outs alternately arranged along a longitudinal direction of the flexible connection element, the exterior portion has a position rod formed thereon, and the position rod is coupled to a corresponding one of the position holes of the flexible connection element.

16. The foldable mobile terminal as claimed in claim 10, wherein the hinge assembly includes a first hinge member, a second hinge member separated from the first hinge member, a tooth plate member located between the first hinge member and the second hinge member, a first connection plate, and a second connection plate, the first and the second connection plates are separated from each other and both located between the first hinge member and the second hinge member, the tooth plate member is coupled to the first hinge member and the second hinge member, and is disposed on the first connection plate and the second connection plate.

17. The foldable mobile terminal as claimed in claim 16, wherein each of the first hinge member and the second hinge member comprises the first base, the second base, the flexible connection element, and the plurality of hinge elements.

18. The foldable mobile terminal as claimed in claim 10, wherein the at least one hinge assembly comprises a first hinge assembly and a second hinge assembly located at two opposite ends of the supporting member, the rotation mechanism further comprises a connecting member configured to reinforce the strength of the rotation mechanism, the connecting member comprises a first connecting unit and a second connecting unit that both are located between the first hinge assembly and the second hinge assembly.

19. The foldable mobile terminal as claimed in claim 18, wherein the rotation mechanism further comprises a flexible decorating member configured to decorate the rotation mechanism, the flexible decorating member is coupled to the supporting member, and located between the first connecting unit and the second connecting unit.

20. The foldable mobile terminal as claimed in claim 19, wherein the rotation mechanism further comprises a plurality of supporting rods mounted on the flexible decorating member, the supporting rods are parallel to and separated from each other, two opposite ends of each of the supporting rods are coupled to the first hinge assembly and the second hinge assembly, respectively.

* * * * *